US012645840B2

(12) United States Patent　　　(10) Patent No.: US 12,645,840 B2
　　　Todd　　　　　　　　　　　　　(45) Date of Patent: Jun. 2, 2026

(54) WATERFALL CONFIDENCE VISUALIZATION GAP IDENTIFICATION AND CORRECTION VIA CONFIDENCE VECTORS

(71) Applicant: Dell Products L.P., Round Rock, TX (US)

(72) Inventor: Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 18/478,807

(22) Filed: Sep. 29, 2023

(65) Prior Publication Data

US 2025/0111094 A1　　Apr. 3, 2025

(51) Int. Cl.
G06F 21/64 (2013.01)
(52) U.S. Cl.
CPC .................................... G06F 21/64 (2013.01)
(58) Field of Classification Search
CPC ...................................................... G06F 21/64
See application file for complete search history.

(56) References Cited

U.S. PATENT DOCUMENTS

| | | | |
|---|---|---|---|
| 10,868,881 B1 * | 12/2020 | Chang ................. | H04L 43/0864 |
| 2020/0296128 A1 * | 9/2020 | Wentz ................. | H04L 63/1433 |
| 2020/0366716 A1 * | 11/2020 | Singh ...................... | H04L 63/08 |
| 2021/0176255 A1 * | 6/2021 | Hill ........................ | H04L 9/3234 |
| 2022/0043721 A1 * | 2/2022 | Shemer ............... | G06F 11/1484 |
| 2022/0317979 A1 * | 10/2022 | Araujo Soares .... | G06F 16/9024 |
| 2022/0366622 A1 * | 11/2022 | Brogger ................. | G06Q 40/06 |
| 2024/0193236 A1 * | 6/2024 | Hunnisett ............. | G06F 21/606 |
| 2024/0329965 A1 * | 10/2024 | Pande ................. | G06F 16/9024 |
| 2024/0331168 A1 * | 10/2024 | Holland ................. | G06T 7/248 |
| 2024/0386054 A1 * | 11/2024 | Wouhaybi ............. | G06F 16/901 |
| 2025/0036960 A1 * | 1/2025 | Subramanya .......... | G06N 3/098 |

* cited by examiner

*Primary Examiner* — Lynn D Feild
*Assistant Examiner* — Vladimir I Gavrilenko
(74) *Attorney, Agent, or Firm* — Workman Nydegger

(57)　　　　　　ABSTRACT

One example method includes generating respective confidence vectors for respective hops associated with a data confidence fabric (DCF), and each hop is associated with one or more trust insertion technologies, identifying a deviation from one of the confidence vectors, generating a waterfall visualization that identifies a location in the DCF, and a type, of the deviation, automatically identifying a remediation action concerning the deviation, and automatically implementing the remediation action in a node of the DCF.

20 Claims, 7 Drawing Sheets

1000

Memory — 1002

NVM — 1004

Processor — 1006

Storage Media — 1008

UI Device — 1010

Application(s) — 1014

Data Storage — 1012

WATERFALL CONFIDENCE VISUALIZATION GAP IDENTIFICATION AND CORRECTION VIA CONFIDENCE VECTORS

FIELD OF THE INVENTION

Embodiments of the present invention generally relate to data confidence fabrics (DCFs). More particularly, at least some embodiments of the invention relate to systems, hardware, software, computer-readable media, and methods, for identification and resolution of gaps in a DCF where a trust insertion component is either not present, or the trust insertion component is present but is not functioning properly.

BACKGROUND

In a DCF, various trust insertion components may associate trust, or confidence, metadata with a piece of data as that data transits the DCF. In considering a DCF, it may be thought of operationally as a vector since data points may be captured as data linearly traverses an eco-system at the application layer. However, this may lead to some potential redundancies and overhead. As noted in the following discussion, problems may arise in the implementation and operation of a DCF.

At times, a trust insertion component may be inoperative, or may not be present at all. As a result, the data may have a less than optimal confidence score. However, a problem that may arise is that an application, or other consumer of the data, may lack awareness as to where the gaps, that is, where confidence information is expected but not provided, are in the confidence fabric that led to the sub-optimal confidence score.

In more detail, while the application may have access to a confidence score, the application may not have any insight into the "confidence coverage" that the data experienced from its birth to delivery. For example, did the data have coverage as it traveled from a sensor to a gateway, from an edge server to the cloud? Knowing this information is not possible in conventional approaches.

Moreover, applications that process edge data may have a large number of requirements on the trustworthy handling of that data. For example, the application may wish that the data has been encrypted from beginning to end, be processed within the confines of a TEE (trustworthy execution environment) such as a secure enclave. Thus, another problem with conventional approaches is that applications are not able to use the confidence score to determine what kind of "holes" are in the DCF—for example, the application has no mechanism to verify whether or not TPM (trusted platform module) technology was being used throughout the path of the data as the data transited the DCF. In a related vein, the application, in conventional approaches, has no mechanism to determine where, in the DCF, the lapse in the application of confidence measures occurred.

Finally, another example problem with conventional approaches relates to the inability to automatically expand coverage within the DCF. In particular, in addition to the lack of visualization tools that emphasize the lack of coverage or presence of holes in a data confidence fabric, there is currently no toolset or automated method for resolving those holes or expanding the coverage to make the data confidence fabric more complete.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
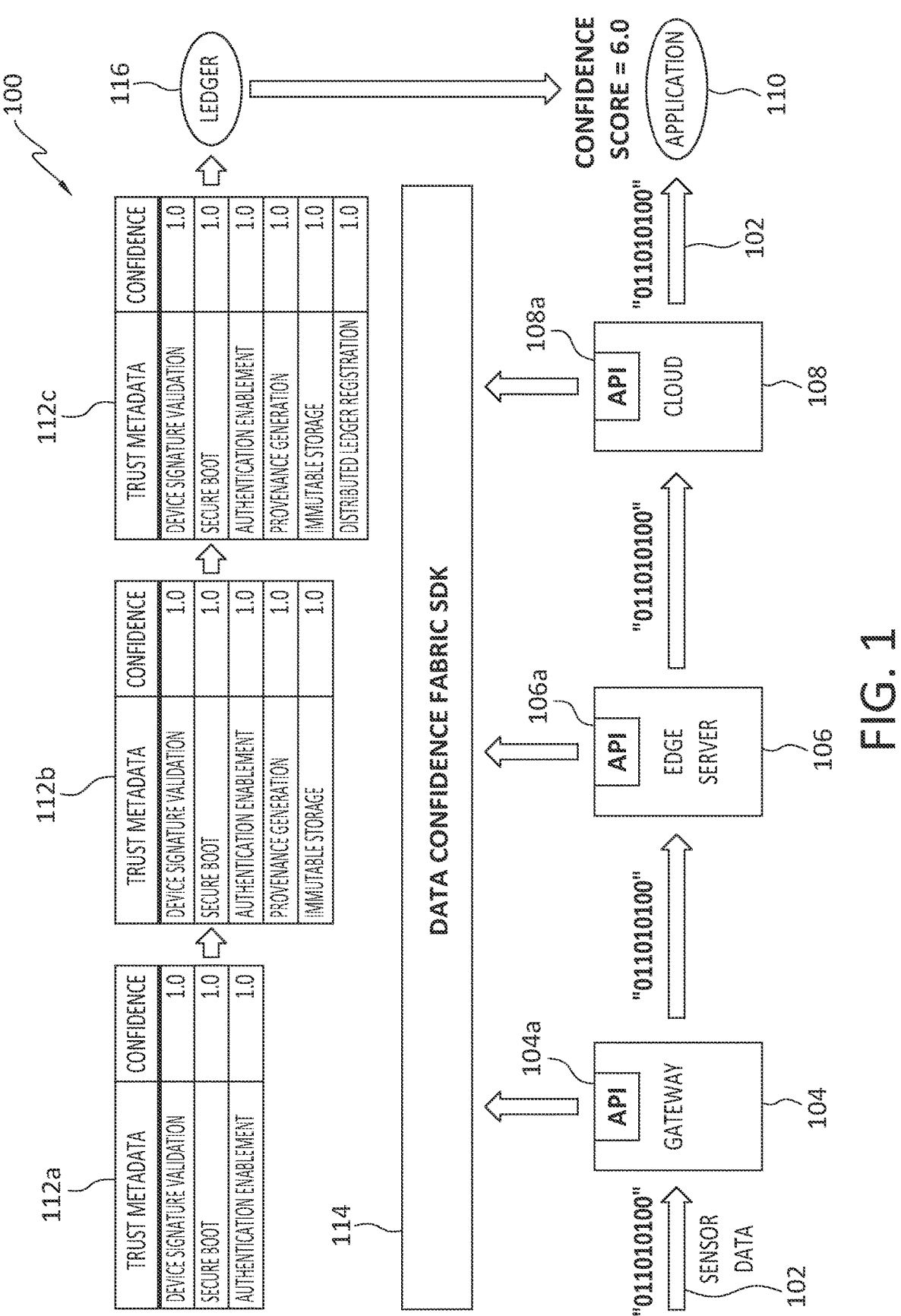
FIG. 1 discloses aspects of an example DCF (data confidence fabric) according to one embodiment.

Embodiments of the present invention generally relate to data confidence fabrics (DCFs). More particularly, at least some embodiments of the invention relate to systems, hardware, software, computer-readable media, and methods, for identification and resolution of gaps in a DCF where a trust insertion component is either not present, or the trust insertion component is present but is not functioning properly.

One example embodiment of the invention uses a so-called 'waterfall visualization' to indicate, among other things, [1] the nodes of the DCF where trust insertion information is to be inserted, [2] the trust insertion components of the DCF, [3] the type(s) of trust insertion information to be applied, and [4] gaps where trust insertion was expected to be performed but, for some reason, was not. Based on this waterfall visualization, which may be presented in visual form to a user, by way of a user interface (UI) for example, various remedial action(s) may be taken resolve the observed problems. For example, an inoperative trust insertion mechanism, such as a TPM for example, may be repaired, or a trust insertion mechanism may be deployed in the DCF where the missing trust insertion information is needed.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that the trustworthiness of data transiting a DCF may be improved. An embodiment of the invention may enable detection, and mitigation, of gaps in a DCF. Various other advantages of one or more example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way. In general, embodiments of the invention may be implemented in connection with systems, software, and components, that individually and/or collectively implement, and/or cause the implementation of, a data confidence fabric (DCF).

With reference now to FIG. 1, embodiments of the invention may be implemented in a variety of operating environments, one example of which is a DCF, denoted at 100 in FIG. 1. In general, the DCF 100 may annotate and score any data that flows within it, providing increased confidence to the applications that use that data, such as for analytical purposes for example.

As shown in FIG. 1, the example DCF 100 concerns the context of edge-based use cases, but the scope of the invention is not limited to such cases or contexts. As shown in the example of FIG. 1, data such as sensor data 102 generated by a sensor flows through one or more tiers, or layers, of the DCF. In the illustrated example, the data 102 may flow through nodes such as a gateway 104, edge server 106, and cloud ecosystem 108, and may ultimately be consumed by one or more applications 110. As trusted handling of the data 102, at the nodes of the various layers, occurs during data 102 delivery, respective trust metadata 112a, 112b, and 112c may be associated with the data 102 by those nodes, that is, by the gateway 104, edge server 106, and/or cloud ecosystem 108. Thus, trust metadata may continue to accumulate as the data 102 passes through the various nodes in its path.

The trust metadata 112a, 112b, and 112c, may comprise, for example, respective confidence scores associated with trust insertion processes performed by the nodes with respect to the data 102. The trust metadata 112a, 112b, and 112c may be associated with the data 102 by respective node APIs (Application Program Interfaces) 104a, 106a, and 108a that communicate with an interface 114 such as an Alvarium SDK (Software Development Kit). After the data 102 has transited the various nodes, the final, comprehensive trust metadata 112c may be entered into a ledger 116 which may make the trust metadata 112c available for use by the applications 110. Note that, in this example, the trust metadata 112c is an accumulation of all the trust metadata respectively added by the gateway 104, edge server 106, and cloud ecosystem 108.

To illustrate with reference to the specific example of FIG. 1, the gateway 104 may annotate, to the data 102, respective trust metadata 112a for each of three different operations. Particularly, the gateway 104 may annotate trust metadata 112a that indicates, among other things: the gateway 104 has successfully validated the signature coming from the device that generated the data 102; the gateway 104 has used a TPM chip to confirm that the BIOS, firmware, or O/S on the gateway 104 was tampered with during boot; and, the gateway 104 is currently running authentication/authorization software to protect the data 102 stream from unwanted inspection or access. With continued reference to the trust metadata, including the trust metadata 112a, a confidence score of "1.0" means that a trust insertion process, such as the secure boot confirmation for example, succeeded, while a score of "0," for example, might indicate that signature validation failed, or was not performed for some reason.

As noted earlier, the DCF metadata, that is, the trust metadata 112a, ultimately arrives at the ledger 116, where a ledger entry may be created that permanently records the contents of the trust metadata 112a table as well as an overall Confidence Score, which is 6.0 in this illustrative example. Note that the equation used to calculate the Confidence Score in the example of FIG. 1 is simply a summation of confidence scores, but other approaches to calculating an overall Confidence Score may alternatively be employed.

A useful aspect of the example DCF 100 is that, as a result of the annotation of trust metadata 112a, 112b, and 112c, the application 110 may have access to additional context about the trustworthiness of the data 102, addressing the problem of potentially untrustworthy or malicious data sources. The problems presented by such data sources are increasingly faced by enterprise customers as they move their business logic closer to non-enterprise, and potentially untrustworthy, data sources at the edge and/or elsewhere. In the example DCF 100, the path of the data 102 may be largely software-dependent, in the sense that data path handling software, which may comprise a respective instance at each of the gateway 104, edge server 106, and cloud ecosystem 108, may call an annotation/scoring API 104a, 106a, and 108a, respectively, and routing software may be provided at these nodes that forwards the annotations along the data path.

With continued reference to the example of FIG. 1, consider the layers of trust that may be provided in the framework of the DCF 100. For example, the gateway 104 may have an embedded Intel TPM chip and it may use that chip to perform "trust services" on behalf of the owner of the data 102. In the example of FIG. 1, a "secure boot" annotation indicates that the gateway 104 has not been tampered with. The TPM chip could also provide keys used to perform signature services on the data. As another example, the edge server 106 may leverage an Intel Secure Enclave as a "trust service" that keeps sensitive data private. Finally, the cloud application 108, such as the Dell Streaming Data Platform for example, may perform additional trust services on the data 102 such as, for example, inspecting the data for drift if the data is coming from a sensor with a well-known range of values and/or a long history of stable behavior.

The recipient of these trust services, such as the data 102 owner for example, may require this level of trust insertion in order that their applications, such as the cloud application 108, can produce insights from the data 102 with confidence. The trust insertion may be of great value because it may significantly reduce operational risk from faulty execution resulting from low-quality, erroneous, or malicious data. Trust services may also significantly reduce the risk of regulatory compliance violations. Preventing these violations may enable trust service recipients to avoid regulatory fines.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Discussion of Aspects of an Example Embodiment of the Invention

B.1 Illustrative Hypothetical Circumstances

Figure 2:
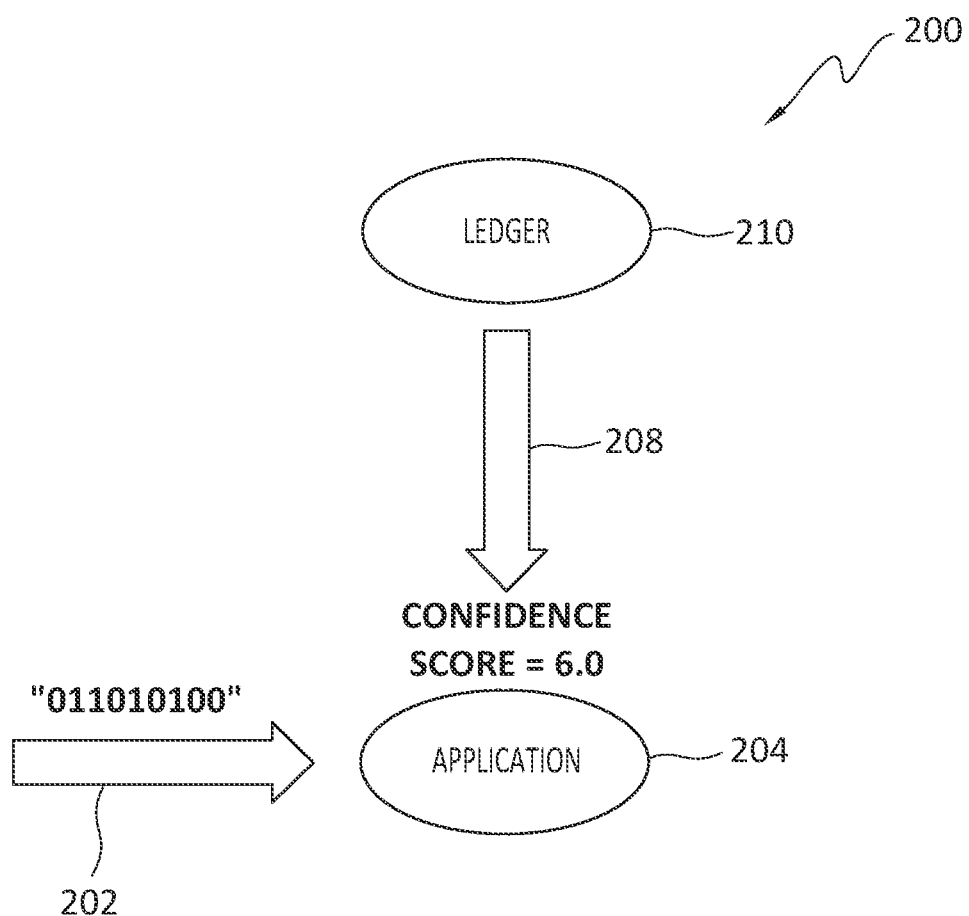
FIG. 2 discloses aspects of a hypothetical problem scenario.

With reference briefly to a hypothetical disclosed in FIG. 2, circumstances are indicated which an embodiment of the invention may be directed to resolving. Particularly, a portion of a DCF 200 is shown in which data 202, having transited the DCF 200, is available for consumption by an application 204, such as a cloud-based application for example. The application 204 obtains a confidence score 208 from a ledger 210, indicating a confidence score of 6.0 for the data 202, although a confidence score of 10.0 may have been expected by the application 204. Not only is the confidence score lower than expected, but the application 204 is unaware of the basis for the lower score. Because the basis for the lower score may or may not be of significance to the application 204, a safe course of action for the application 204 is not to use the data 202. This non-use of the data 202 however may compromise the operations of the organization that is using the application.

B.2 Example Visualization of DCF Trust Insertion Coverage

Figure 3:
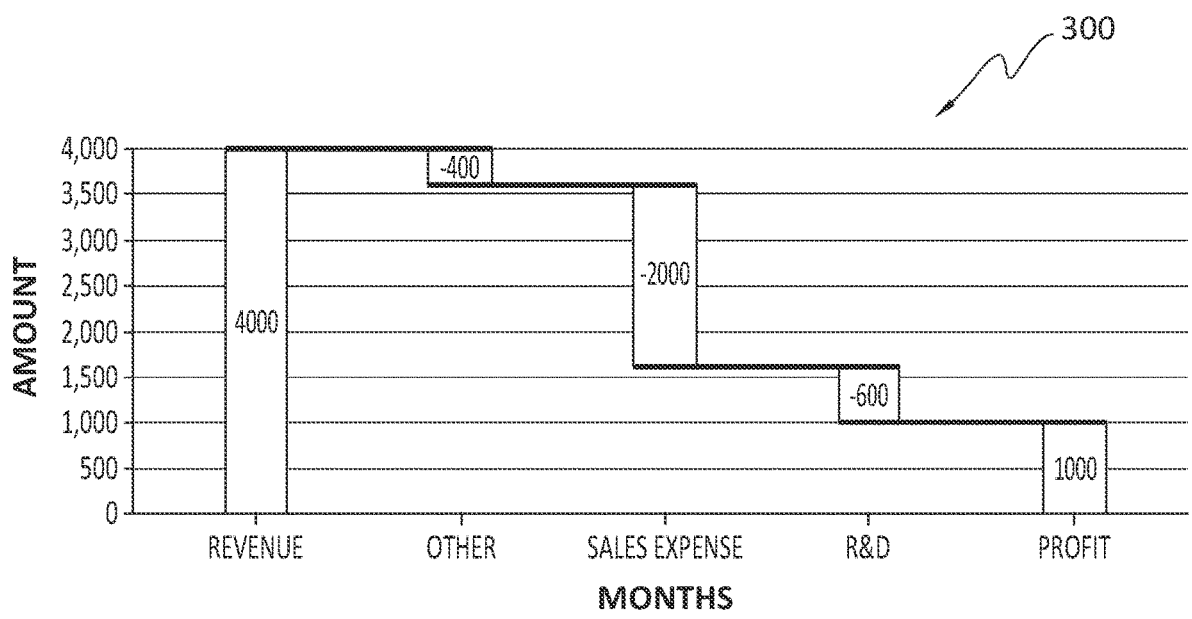
FIG. 3 discloses an example waterfall visualization.

With reference now to FIG. 3, a graphic 300 is disclosed that may be referred to herein as a 'waterfall' visualization. In a financial context, and for the purposes of illustration, waterfall visualizations may be especially helpful for financial insights as a mechanism to "follow the money." In particular, FIG. 3 discloses a waterfall visualization 300 for Revenue/Expenses/Profits. In this example, the Revenue declines down to Profit, in a visual manner similar to the configuration of a waterfall, as a result of expenses incurred against the Revenue such as Other, Sales Expense, and R&D. As discussed below, analogous visualizations may be employed in an embodiment of the invention.

B.3 Augmenting Confidence Equations with Confidence Vectors

In one embodiment, the first step in the process of waterfall confidence visualization and automated expansion may be to leverage the DCF policy equation for a given DCF. Traditional DCF policy equations specify the need for particular types of trust insertion technology in the fabric, but they don't describe where to apply that technology. For example, an example confidence equation is set forth below that emphasizes the need for TPM and TEE chips, secure boot, and encryption/TLS:

$$100\% \text{ confidence} = 2 * TEE + 1 * TPM + 2 * TLS$$

In this example, in order to receive a 100% confidence score, the DCF must leverage a TEE, TPM, and TLS (transport layer security) approach. If, for example, the TEE is not present in the DCF, the maximum achievable confidence score would be 60%, because the TEE is double weighted. As another example, if the TPM is not present, the maximum achievable confidence score would be 80%. In order to enable waterfall visualizations, these types of equations may be augmented by "confidence vectors" that specify "where," that is, at what respective points in the data journey through the DCF, these technologies should be applied.

Figure 4:
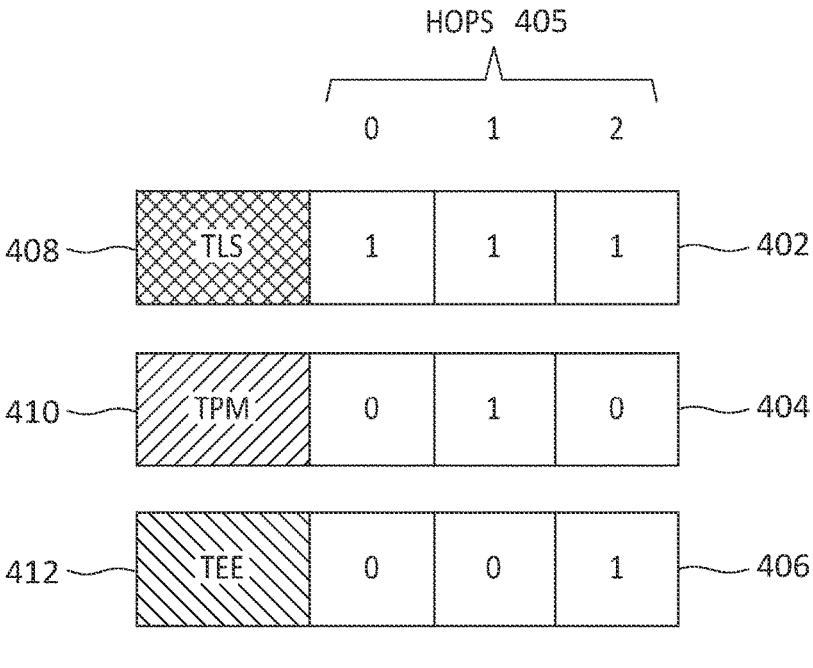
FIG. 4 discloses example confidence vectors for DCF hops, according to one embodiment.

With attention now to FIG. 4, some example confidence vectors 402, 404, and 406, such as may be used in conjunction with the equation above, are disclosed. More particularly, each of the confidence vectors 402-406 corresponds to a respective "hop" in a DCF. The hops hop-0, hop-1, and hop-2, are collectively denoted at 405, and each of the confidence vectors 402, 404, and 406 corresponds to a respective trust insertion technology 408, 410, and 412. In this example, the trust insertion technologies comprise, respectively, TLS 408, TPM 410, and TEE 412.

Figures 5, 6:
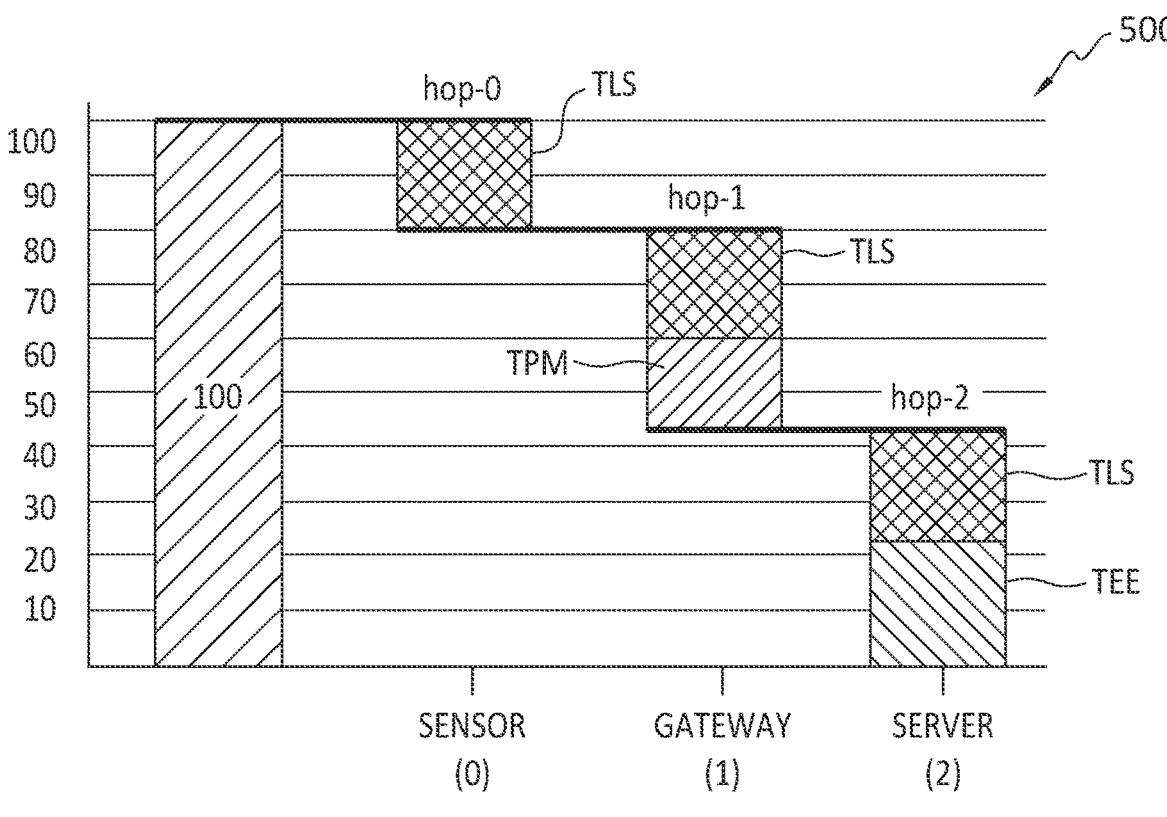
FIG. 5 discloses an example DCF waterfall confidence visualization, according to one embodiment.
FIG. 6 discloses a hole identification via DCF waterfall visualization, according to one embodiment.

The hop 405 information indicates where, in the DCF, a particular trust insertion technology is to be employed to insert trust metadata. In the example of FIG. 5, the hop-0 corresponds to the data origination point, which may comprise a sensor for example. The hop-1 indicates a first receiver of the data from the data origination point, where the first receiver may be a gateway connected to the sensor. Finally, the hop-2 indicates a second receiver of the data, such as edge server with more compute power and memory than a gateway or sensor, where the edge server receives the data from the first receiver of the data, which is a gateway in this example.

With continued reference to FIG. 4, a value of '1' in a confidence vector 402, 404, or 406, indicates that a trust insertion technology is to be applied at the corresponding hop 405, while a value of '0' indicates that the trust insertion technology is not applied at that hop 405. Thus, the confidence vector 402 is populated with all '1' values, indicating that the TLS 408 trust insertion technology is to be applied at hop-0, hop-1, and hop-2. In contrast, the confidence vector 404 has a '1' value only at hop-1, and '0' values at hop-0 and hop-2. This means that, in this example, the TPM 410 trust insertion technology should be applied only at hop-1. Finally, the confidence vector 406 has a '1' value only at hop-2, and '0' values at hop-0 and hop-1. This means that, in this example, the TEE 412 trust insertion technology should be applied only at hop-2.

Put another way, the confidence vectors 402, 404, and 406, collectively indicate that: TLS 408 trust insertion technology should be used through the entire journey of the data; TPM 410 trust insertion technology should be used upon first receipt of the data, such as to check or generate a signature for example; and the TEE 412 trust insertion technology should be used at next level, for example at an edge server where there may be a need to analyze the data in a secure way. As shown below, the equation shown above, together with the confidence vectors, enables the generation of a waterfall DCF visualization.

B.4 Creation of Waterfall Confidence Visualizations

With attention now to FIG. 5, there is disclosed a 'perfect' waterfall confidence visualization 500. This example visualization 500 is referred to as 'perfect' due to the fact that there are no coverage gaps, in terms of the insertion of trust information, as the data transits from server to gateway to sensor. The following method and algorithm may be employed for calculation of this visualization:

For each annotation in a DCF log or ledger:
Determine which "hop" the annotation occurred in;
Determine if that annotation is "required" for that hop; and
Increase the score if the annotation was satisfied for that hop
Leave the score unchanged if it was not This algorithm, for a perfectly executed data transaction, results in a 100% score. The true value, however, occurs when the condition was not executed for a given hop.

With continued attention to FIG. 5, and referring again to FIG. 4, it can be seen that the visualization 500 embodies the scheme disclosed in FIG. 4. That is, for example, the TLS trust insertion technology is applied at hop-0, hop-1, and hop-2, while the TPM trust insertion technology is applied only at hop-1. And the TEE trust insertion technology is applied only at hop-2. Because there are no gaps or holes in the coverage, such as would cause a deduction against a perfect confidence score, the confidence score of the scheme shown in FIG. 5 is 100, as shown on the left side of the visualization 500.

B.5 Data Confidence "Holes" Waterfall Visualization

One example benefit of an embodiment of a DCF waterfall visualization becomes apparent when there is a problem with the DCF. Particularly, consider the example of FIG. 6, in which the TPM component is either not present, or not functional, on the gateway device. The waterfall visualization makes clear that there is a coverage "hole" in the DCF.

With reference again to FIG. 4, as well as to FIG. 6, the confidence vector 404 for the TPM 410 trust insertion technology indicates that the first hop, that is, hop-1, in the DCF must have a functional TPM chip. However, as shown in the visualization 600 in FIG. 6, there is a gap indicating that the TPM chip was not employed at the gateway, that is, at hop-1. The hole 602 thus corresponds to a drop, or deduction, 603 in the overall confidence score 604 of the data. In this example, the lack of a functional TPM chip corresponds to a 15% dip in confidence, from 100 to 85. Note that the drop, or deduction, in a confidence score may be a function of the relative importance of a trust insertion technology, and/or other factors.

Thus, the absence of a particular required trust insertion technology may correspond to a drop in the confidence score, where the magnitude of the drop may be a function of, for example, any one or more of [1] the nature and/or relative importance of the trust insertion technology, [2] the location in the DCF where that trust insertion technology was to be applied, [3] the upstream source of the data, [4] the downstream recipient of the data, [5] the relative importance of the data, [6] the confidentiality of the data, and/or [7] other factors. The foregoing are presented only by way of example, and are not intended to limit the scope of the invention in any way.

Figure 7:
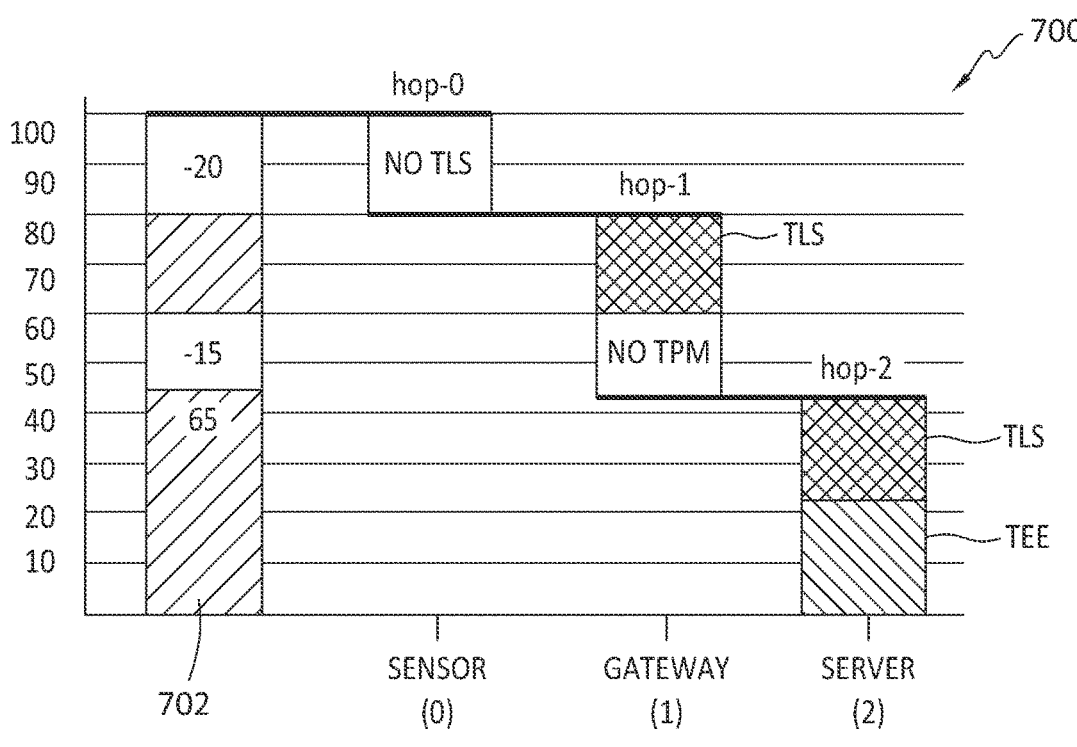
FIG. 7 discloses a TLS hole identified on a sensor device, according to one embodiment.

With reference now to FIG. 7, and referring again to the example confidence vectors of FIG. 4, another example of a DCF hole is disclosed which results when the sensor device, or other edge device, fails to use TLS to transfer the data. In particular, the visualization 700 indicates that TLS trust insertion technology was not employed at hop-0 and, further, TPM trust insertion technology was not employed at hop-1, as required. The failure to use the TLS and TPM trust insertion technologies results in corresponding respective deductions from the overall confidence score 702. In particular, the TLS omission results in a deduction of 20, and the TPM omission results in a decision of 15, for a total deduction of 35, thus resulting in a reduced overall confidence score 702, for the data, of 65. As this example illustrates, the lack of TLS trust insertion technology is weighted somewhat more heavily than the lack of TPM trust insertion technology.

B.6 Automated Remediation of DCF Coverage Gaps

Figure 8:
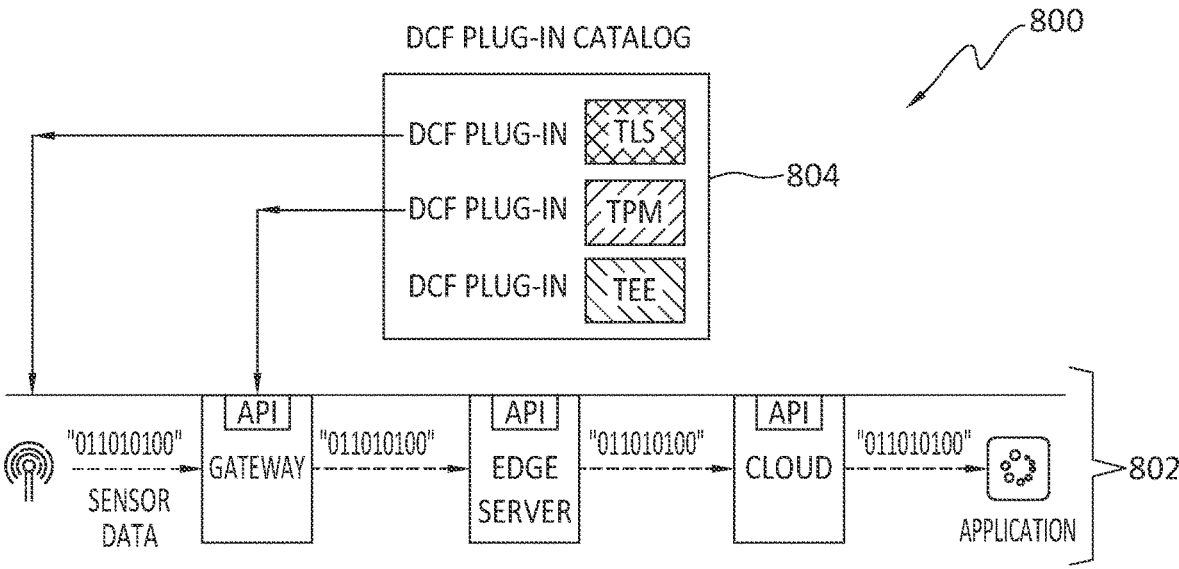
FIG. 8 discloses an automatic DCF plug-in deployment and confidence increase, according to one embodiment.

Not only do confidence vectors enable a clear identification of the gaps in a DCF, but the underlying data structure may also enable automated correction of these identified gaps. With reference now to FIG. 8, an example scheme 800 for automated remediation is disclosed. In general, the scheme 800 may involve a portion 802 of a DCF, and a DCF plug-in catalog 804 that is configured to communicate with one or more of the elements of the portion 802 of the DCF.

Initially, a gap or hole in the DCF may be identified, as disclosed elsewhere herein. For example, the visualization 700 highlights two "gaps" or "holes" in the DCF, indicating there is a TLS problem on the sensor device, and a TPM problem on the gateway device. Use of one or more confidence vectors, as disclose in FIG. 4 for example, may enable use of an automated program to search through the DCF plug-in catalog 804 for TLS and TPM functionality.

When the DCF plug-ins have been identified that are suitable to resolve the gaps that have been identified, those DCF plug-ins may then be automatically sent to the respective deficient devices, which may then automatically install the DCF plug-in(s). For example, the DCF plug-in may be installed at a sensor or other edge device. In an embodiment, the sensor or edge device may install the plug-in itself. The performance of the sensor, edge device, or other device, may thus be improved by installation of the DCF plug-in, since the DCF plug-in provides trust insertion functionality, the application of which may establish, or increase, confidence that data in the DCF has been correctly and securely handled by that device and/or by its components.

In an embodiment, the remediated devices may report their updated status to an application, administrator, and/or other entities, so that these entities are made aware that the deficiencies have been resolved. In another embodiment, such reporting may be omitted. In one embodiment, the automated DCF plug-in installation may be performed as disclosed in U.S. patent application Ser. No. 18/194,726, entitled APPLICATION DISCOVERY AND DCF OVERLAY, and filed 3 Apr. 23, which is incorporated herein in its entirety by this reference.

C. Example Methods

Figure 9:
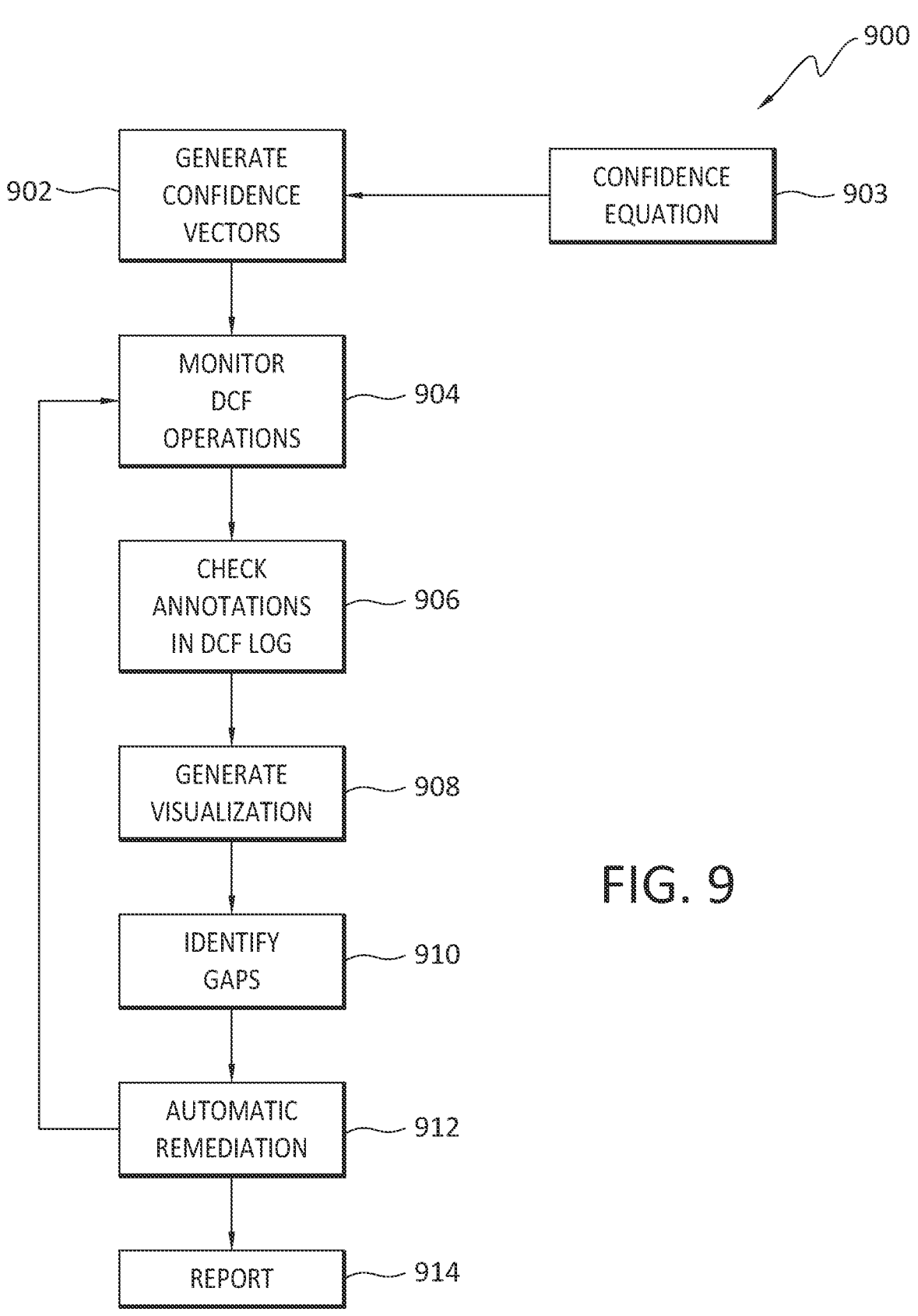
FIG. 9 discloses a method according to one embodiment.

It is noted with respect to the disclosed methods, including the example method of FIG. 9, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 9, a method according to one embodiment of the invention is referenced at 900. In an embodiment, part, or all, of the method 900 may be performed automatically without human intervention. The method 900 may be performed in connection with a DCF that may comprise hundred, thousands, tens of thousands, or more, nodes. Thus, the method 900, and its constituent operations, are not amenable to practical, or timely, performance by a human.

The example method 900 may begin with the generation of confidence vectors that identify where, in a DCF, various trust insertion technologies are to be applied. The confidence vectors may be generated 902 based on a confidence equation 903.

At some point after the confidence vectors are generated, and trust insertion technologies implemented in the DCF, the DCF may begin operations, which may be monitored 904, possibly on an ongoing basis. As a part of DCF operations 904, annotations indicating the insertion of trust information may be generated and stored in a log or ledger associated with the DCF.

From time to time, and/or when a problem occurs, the annotations in the DCF ledger may be checked 906. The annotations may indicate that specified trust insertion operations and technologies were, or were not, employed at various nodes of the DCF network. Thus, the annotations may be used to generate 908 a visualization that visually indicates where there is a gap or hole in the DCF, and thus identifies 910 those gaps.

After the gaps in the DCF have been identified, an automatic remediation process 912 may be performed to resolve the gaps. For example, the automatic remediation process 912 may identify DCF plug-ins that may be used to remediate the gaps, and may automatically obtain, and transmit to the affected nodes, the appropriate DCF plug-ins. When the automatic remediation process 912 has been successfully completed, a report 914 may be made indicating that the gaps in the DCF have been resolved. As a result of performance of the automatic remediation 912, it may be expected that confidence scores in the DCF will improve, and data uptake/use by data consumers such as applications may increase as a result of the improved confidence scores.

D. Further Example Embodiments

Following are some further example embodiments of the invention. These are presented only by way of example and are not intended to limit the scope of the invention in any way.

Embodiment 1. A method, comprising: generating respective confidence vectors for respective hops associated with a data confidence fabric (DCF), and each hop is associated with one or more trust insertion technologies; identifying a deviation from one of the confidence vectors; generating a waterfall visualization that identifies a location in the DCF, and a type, of the deviation; automatically identifying a remediation action concerning the deviation; and automatically implementing the remediation action in a node of the DCF.

Embodiment 2. The method as recited in any preceding embodiment, wherein one of the confidence vectors indicates a node, in the DCF, where a trust insertion technology should be employed, and that confidence vector also indicates a particular nature of the trust insertion technology.

Embodiment 3. The method as recited in any preceding embodiment, wherein the confidence vectors are generated based on a confidence equation that accounts for each of the trust insertion technologies.

Embodiment 4. The method as recited in any preceding embodiment, wherein the remediation action comprises installation of a plug-in at a node of the DCF where the deviation occurred, and automatically implementing the remediation action comprises installing the plug-in at that node.

Embodiment 5. The method as recited in any preceding embodiment, wherein the waterfall visualization indicates an extent to which the deviation has affected a confidence score associated with data passing through the DCF.

Embodiment 6. The method as recited in any preceding embodiment, wherein automatically implementing the remediation action comprises obtaining a plug-in from a DCF plug-in catalog, and transmitting the plug-in to a node of the DCF where the deviation occurred.

Embodiment 7. The method as recited in any preceding embodiment, wherein a data confidence score indicated in the waterfall visualization is recalculated after the remediation action has been implemented.

Embodiment 8. The method as recited in any preceding embodiment, wherein another deviation is identified that has an impact on a confidence score associated with data transiting the DCF that is different than an impact associated with the deviation.

Embodiment 9. The method as recited in any preceding embodiment, wherein the trust insertion technologies comprise any one or more of a trustworthy execution environment, a trusted platform module, and transport layer security.

Embodiment 10. The method as recited in any preceding embodiment, wherein implementation of the remediation action causes an increase in a confidence score of data associated with the DCF.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the dis- closed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in lan- guage specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is pro- vided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
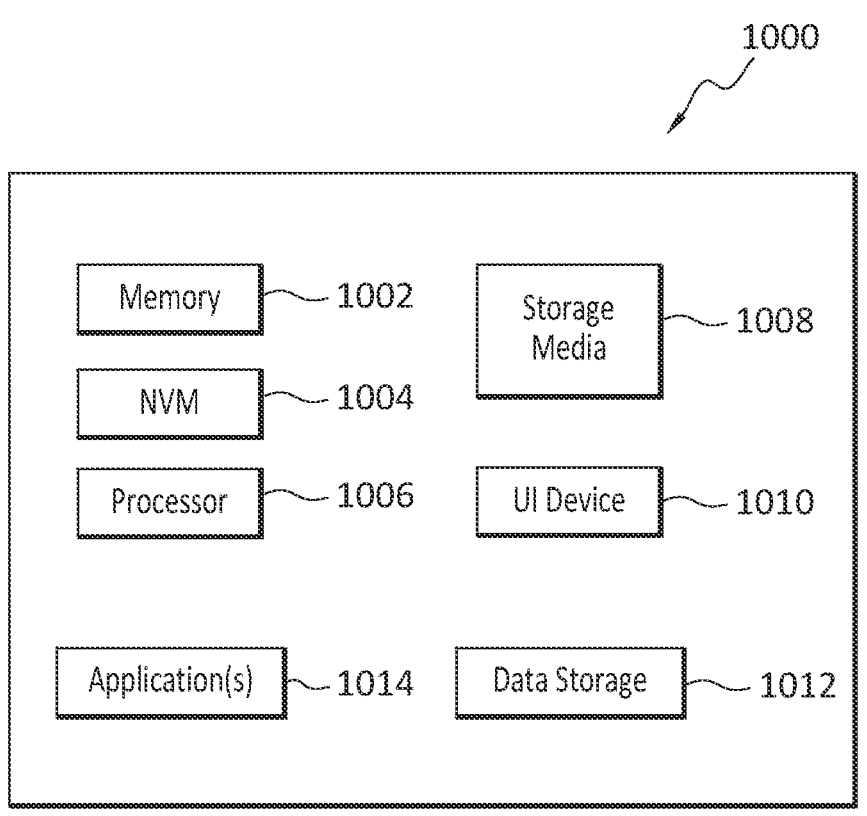
FIG. 10 discloses a computing entity operable to perform any of the disclosed methods, processes, and operations.

With reference briefly now to FIG. 10, any one or more of the entities disclosed, or implied, by FIGS. 1-9, and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtual- ization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential charac- teristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

generating respective confidence vectors for respective hops associated with a data confidence fabric (DCF), wherein each hop is associated with one or more trust insertion technologies and with a respective node, through which data transits in the DCF;

identifying a deviation of one confidence vector of the confidence vectors in an overall confidence score;

generating a waterfall visualization that identifies a loca- tion of a node in the DCF, and a type, of the deviation of the one confidence vector, wherein the node corre- sponds to the one confidence vector;

automatically identifying a remediation action concerning the deviation; and automatically implementing the remediation action in the node of the DCF.

2. The method as recited in claim 1, wherein the one confidence vector of the confidence vectors indicates the node, in the DCF, where a trust insertion technology should be employed, and the one confidence vector also indicates a particular nature of the trust insertion technology.

3. The method as recited in claim 1, wherein the confidence vectors are generated based on a confidence equation that accounts for each of the one or more trust insertion technologies.

4. The method as recited in claim 1, wherein the remediation action comprises installation of a plug-in at the node of the DCF where the deviation occurred, and automatically implementing the remediation action comprises installing the plug-in at the node.

5. The method as recited in claim 1, wherein the waterfall visualization indicates an extent to which the deviation has affected a confidence score associated with the data passing through nodes in the DCF.

6. The method as recited in claim 1, wherein automatically implementing the remediation action comprises obtaining a plug-in from a DCF plug-in catalog, and transmitting the plug-in to the node of the DCF where the deviation occurred.

7. The method as recited in claim 1, wherein a data confidence score indicated in the waterfall visualization is recalculated after the remediation action has been implemented.

8. The method as recited in claim 1, wherein another deviation is identified that has an impact on a confidence score associated with the data transiting the DCF that is different than an impact associated with the deviation.

9. The method as recited in claim 1, wherein the one or more trust insertion technologies comprise any one or more of a trustworthy execution environment, a trusted platform module, and transport layer security.

10. The method as recited in claim 1, wherein implementation of the remediation action causes an increase in a confidence score of the data associated with the DCF.

11. A non-transitory storage medium having stored therein instructions that are executable by one or more hardware processors to perform operations comprising:

generating respective confidence vectors for respective hops associated with a data confidence fabric (DCF), wherein each hop is associated with one or more trust insertion technologies and with a respective node, through which data transits in the DCF;

identifying a deviation of one confidence vector of the confidence vectors in an overall confidence score;

generating a waterfall visualization that identifies a location of a node in the DCF, and a type, of the deviation of the one confidence vector, wherein the node corresponds to the one confidence vector;

automatically identifying a remediation action concerning the deviation; and automatically implementing the remediation action in node of the DCF.

12. The non-transitory storage medium as recited in claim 11, wherein the one confidence vector of the confidence vectors indicates the node, in the DCF, where a trust insertion technology should be employed, and the one confidence vector also indicates a particular nature of the trust insertion technology.

13. The non-transitory storage medium as recited in claim 11, wherein the confidence vectors are generated based on a confidence equation that accounts for each of the one or more trust insertion technologies.

14. The non-transitory storage medium as recited in claim 11, wherein the remediation action comprises installation of a plug-in at the node of the DCF where the deviation occurred, and automatically implementing the remediation action comprises installing the plug-in at the node.

15. The non-transitory storage medium as recited in claim 11, wherein the waterfall visualization indicates an extent to which the deviation has affected a confidence score associated with the data passing through nodes in the DCF.

16. The non-transitory storage medium as recited in claim 11, wherein automatically implementing the remediation action comprises obtaining a plug-in from a DCF plug-in catalog, and transmitting the plug-in to the node of the DCF where the deviation occurred.

17. The non-transitory storage medium as recited in claim 11, wherein a data confidence score indicated in the waterfall visualization is recalculated after the remediation action has been implemented.

18. The non-transitory storage medium as recited in claim 11, wherein another deviation is identified that has an impact on a confidence score associated with the data transiting the DCF that is different than an impact associated with the deviation.

19. The non-transitory storage medium as recited in claim 11, wherein the one or more trust insertion technologies comprise any one or more of a trustworthy execution environment, a trusted platform module, and transport layer security.

20. The non-transitory storage medium as recited in claim 11, wherein implementation of the remediation action causes an increase in a confidence score of the data associated with the DCF.

* * * * *